Feb. 21, 1967     W. W. CEASE     3,305,126
FOOD PACKAGES FOR AUTOMATED DISPENSING
Filed June 11, 1963
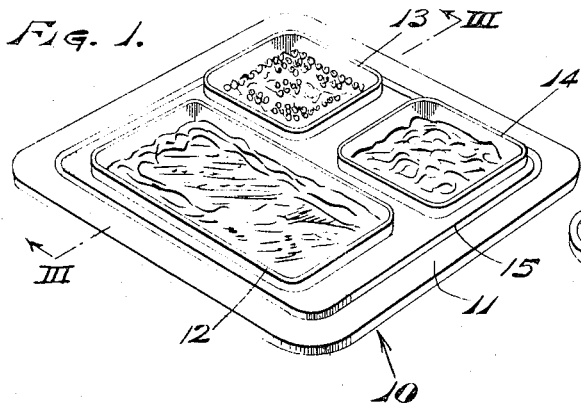
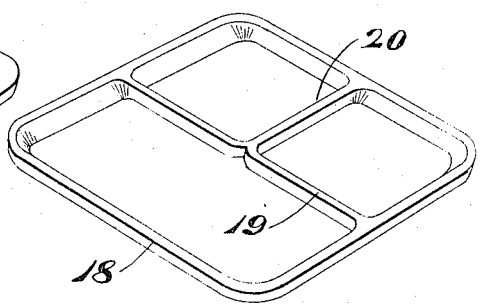
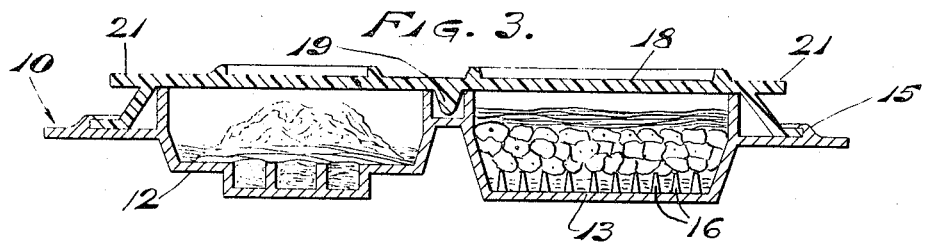
INVENTOR.
William W. Cease
BY
Christel & Bean
ATTORNEYS

United States Patent Office 3,305,126
Patented Feb. 21, 1967

3,305,126
FOOD PACKAGES FOR AUTOMATED
DISPENSING
William W. Cease, Fredonia, N.Y., assignor to
Cease Central, Inc., Dunkirk, N.Y.
Filed June 11, 1963, Ser. No. 287,121
3 Claims. (Cl. 220—23.83)

This invention relates to receptacles or package means for holding food preparatory to and up to the point of dispensing the same to consumers and wherein all or part of the package means comprises the serving dish for the food.

In accordance with the present invention receptacle means are provided for holding foods in a covered or enclosed condition and by such means that receptacles may be readily, accurately and securely stacked during handling and storage.

The receptacle means of the present invention, due to the novel stacking, handling, food enclosing and storage characteristics are of particular advantage when used in conjunction with automated food service apparatus. The receptacle construction and arrangement disclosed herein may be securely nested or stacked and provides special means for cooperation with vending or dispensing mechanisms whereby individual food receptacles may be conveniently and safely separated from a stack or tier of receptacles by mechanical means provided for that purpose.

The receptacle of the present invention has a holder or container having an inverted service plate acting as a cover for the holder and with means on both elements for positively separating the same in the process of dispensing the food, such dispensing including an inverting step for transferring the food from the holder to the service plate.

While a single specific embodiment of the food packages of the present invention is illustrated in the drawing and described in detail in the following specification, it is to be understood that numerous mechanical modifications may be made without departing from the spirit and scope of the invention which is limited only as defined in the appended claims.

In the drawings:

FIG. 1 is a perspective view of one form of food holder or container unit of the present invention;

FIG. 2 is a perspective view of a service plate adapted to serve as a cover for the holder or container of FIG. 1; and FIG. 3 is a cross sectional view taken approximately on the line III—III of FIG. 1 showing the holder or container of FIG. 1 and the service plate of FIG. 2 in assembled relation to make up one form of food package in accordance with the present invention.

Like characters of reference denote like parts throughout the several figures of the drawings. The package arrangement shown in FIGS. 1 through 3 comprises a holder designated generally by the reference numeral 10 and comprising a flat panel portion 11 having integral container sections 12, 13 and 14 and a marginal ledge or bead 15 at its upper surface, the ledge 15 being undercut along its inner side.

In FIGS. 2 and 3 a service plate is designated 18 and ribs 19 and 20 therein divide the same into areas corresponding to and adapted to register with the container sections 12, 13 and 14. If desired, the rib 19 may fit between the containers 12, 13 and 14 as shown in FIG. 3 to assist in locating service plate 15 with respect to holder 10.

The rim of plate 18 is adapted to snap into the undercut portion of ledge 15 as clearly shown in FIG. 3. In the present instance the holder 10 may be of aluminum and the service plate 15 of plastic material which is slightly flexible to facilitate snap-in assembly. In some instances the plates 15 may be relatively inflexible, as when they are china, glass or other ceramic material. In such case the holder will perferably be of plastic or other flexible material to permit such assembly.

In the present embodiment of the invention the assembled holders and plates need not be stacked in a continuous vertical stack excepting for transportation or other handling preliminary to the actual vending or dispensing thereof. When they are positioned for dispensing the packages may comprise a tier of vertically spaced separately supported packages as in the apparatus of my application Serial No. 259,158, now Patent No. 3,241,709, dated Mar. 22, 1966. Furthermore, in this embodiment the assembled holders and plates are intended to be inverted prior to separation and ultimate dispensing of food on the service plate, likewise as shown in Patent No. 3,241,709, and the holder 10 may be disposed of as contemplated in that application.

In the form of the present invention illustrated in FIGS. 1, 2 and 3 the bottom wall of service plate 18 is extended at opposite sides to form projecting flanges 21 which facilitate separation of the resiliently engaged holders and plates. The mechanical means for effecting this separation in cooperation with flanges 21 of plate 18 and the outer margins of holder 10 may be, for instance, as illustrated in FIG. 10 of Patent No. 3,241,709.

Referring to FIG. 3 it will be noted that container section 12 includes a well portion having rib formations for supporting solid food above the well portion, as in FIGS. 1, 2, 7, 11, 12 and 13 of my prior application, Serial No. 220,517, filed Aug. 30, 1962, now Patent No. 3,240,610, dated Mar. 15, 1966. Also, the container 13 has integrally molded upstanding tapered pin or pyramid formations spaced uniformly about its bottom interior surface as at 16 in FIG. 3 for supporting food such as peas above such bottom wall whereby butter or other semi-liquid dressing may be contained in the lower part of the container prior to inversion thereof.

I claim:

1. A package for handling, dispensing and serving prepared foods comprising a food receptacle having a marginal flange, said receptacle including a plurality of compartments open at their upper sides and including wall portions extending above said marginal flange and around each compartment, a service plate adapted to be applied over said receptacle in inverted position to serve as a cover for said compartments with the marginal portion of said service plate engaging the upper surface of said marginal flange and with the bottom interior surface of said service plate abutting the upper edges of said wall portions to seal the several compartments of said receptacle from each other and from the surrounding atmosphere.

2. A package as in claim 1 having a retention groove extending along the upper surface of said marginal flange of said receptacle, the rim of said service plate having resilient snap-in engagement within said retention groove.

3. A package as in claim 2 wherein said service plate has outstanding flange means spaced vertically from the marginal flange thereof whereby said outstanding flange means and the marginal flange of said receptacle are engageable for separating the receptacle and service plate.

References Cited by the Examiner

UNITED STATES PATENTS

| | | | |
|---|---|---|---|
| 1,948,778 | 2/1934 | Zoia | 220—97 |
| 1,978,175 | 10/1934 | Stalle | 220—23.83 |
| 2,914,104 | 11/1959 | Jocelyn | 150—.5 |
| 2,944,694 | 7/1960 | Kinsey | 220—23.83 |
| 3,009,569 | 11/1961 | Blias | 206—65 |
| 3,019,783 | 2/1962 | Clarke. | |
| 3,107,027 | 10/1963 | Hong | 220—23.8 |
| 3,164,285 | 1/1965 | Melich | 220—97 |

FOREIGN PATENTS 572,551  10/1945  Great Britain.

THERON E. CONDON, *Primary Examiner.*

GEORGE E. LOWRANCE, *Examiner.*